United States Patent [19]

Faccia

[11] Patent Number: 5,143,221
[45] Date of Patent: Sep. 1, 1992

[54] APPARATUS FOR SCREENING ANIMAL FODDER PRODUCTS UNLOADED FROM MIXING TRUCKS

[76] Inventor: Tiziano Faccia, via Padova 102, 35026 Conselve (Province of Padova), Italy

[21] Appl. No.: 624,446

[22] Filed: Dec. 10, 1990

[30] Foreign Application Priority Data

Dec. 15, 1989 [IT] Italy ................. 30780 B/89

[51] Int. Cl.⁵ .......................... B03C 1/22
[52] U.S. Cl. ................. 209/215; 209/223.1; 209/231; 366/186; 366/349
[58] Field of Search ......... 366/186, 189, 190, 192, 366/193, 195, 196, 273, 349, 603; 209/215, 223.1, 231, 225

[56] References Cited

U.S. PATENT DOCUMENTS

| | | | |
|---|---|---|---|
| 570,496 | 11/1896 | Osborn | 209/223.1 |
| 938,576 | 11/1909 | Grotenrath | 209/223.1 |
| 1,771,966 | 7/1930 | Naylor | 209/215 |
| 2,192,462 | 3/1940 | Wagner | 209/223.1 |
| 3,186,689 | 6/1965 | Davies | 366/193 |
| 3,642,254 | 2/1972 | Ternes | 366/195 |
| 3,926,792 | 12/1975 | Buford | 209/215 |
| 4,003,502 | 1/1977 | Barcell | 222/168 |
| 4,310,252 | 1/1982 | Ryan | 366/193 |

FOREIGN PATENT DOCUMENTS

| | | |
|---|---|---|
| 0387547 | 9/1990 | European Pat. Off. . |
| 685461 | 12/1939 | Fed. Rep. of Germany ...... 209/215 |
| 3009964 | 1/1981 | Fed. Rep. of Germany . |
| 3236121 | 3/1984 | Fed. Rep. of Germany . |
| 3731653 | 4/1989 | Fed. Rep. of Germany . |
| 8303970 | 6/1985 | Netherlands .................... 209/215 |
| 487673 | 1/1976 | U.S.S.R. ......................... 209/231 |
| 959707 | 9/1982 | U.S.S.R. . |
| 1498411 | 8/1989 | U.S.S.R. . |
| 2139911 | 12/1984 | United Kingdom . |

*Primary Examiner*—Harvey C. Hornsby
*Assistant Examiner*—Mark Spisich
*Attorney, Agent, or Firm*—Guido Modiano; Albert Josif

[57] ABSTRACT

The apparatus comprises a container mounted on a chassis having wheels and a supporting structure. A powered vertical auger is provided inside the container for mixing animal fodder therein. A side wall of the container is provided with an opening which can be selectively closed by a door. A conveyor belt having side walls and a lower chute is located adjacent the opening in the container, for transporting fodder therefrom upon opening the door. Permanent magnets are fixed to the side walls and lower chute of the conveyor and to a tubular element of the supporting structure arranged above the conveyor for removing and retaining any ferromagnetic material contained in the animal fodder being conveyed.

2 Claims, 1 Drawing Sheet

APPARATUS FOR SCREENING ANIMAL FODDER PRODUCTS UNLOADED FROM MIXING TRUCKS

BACKGROUND OF THE INVENTION

The present invention relates to an apparatus for screening animal fodder products unloaded from mixing trucks.

It is known that mixing trucks, in which coarse or fibrous forage, protein and mineral integrators and concentrates such as flours, mashes, pulps etc. are introduced, shredded and mixed, are currently used in the field of zootechnics for feeding animals.

The loaded forage is generally constituted by bales of straw or hay which may contain pieces of iron wires or the like which have been either inadvertently picked up during formation of the bales or separated from any bindings which keep the bales together.

Such pieces of iron constitute a considerable danger for animals, since if they are ingested they can produce considerable damage to the organs of the digestive system and lead to the death of said animals.

SUMMARY OF THE INVENTION

The aim of the present invention is to provide an apparatus which can remove any pieces of iron from the fodder loaded by mixing trucks during distribution to the troughs.

A consequent primary object is to provide an apparatus which can be conveniently applied both to mixing trucks which are already in use and to newly manufactured trucks.

Another object is to provide an apparatus which is simple and functional.

Not least object of the invention is to have low costs which can be achieved with conventional production facilities.

This aim, these objects and others which will become apparent hereinafter are achieved by an apparatus for screening animal fodder products unloaded from mixing trucks, as defined in the appended claims.

BRIEF DESCRIPTION OF THE DRAWINGS

Further characteristics and advantages of the invention will become apparent from the detailed description of an embodiment thereof, illustrated only by way of nonlimitative example in the accompanying drawings, wherein.

DESCRIPTION OF THE PREFERRED EMBODIMENTS

Figure 1:
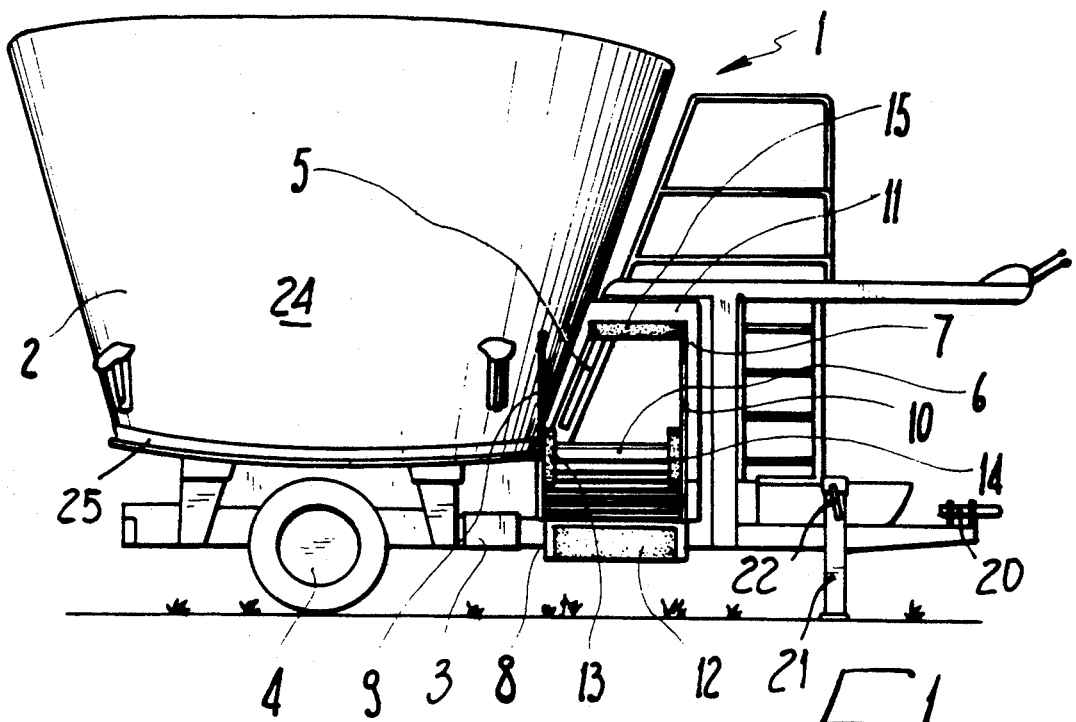
FIG. 1 is a side view of a mixing truck on which the apparatus according to the invention is applied.
Figure 2:
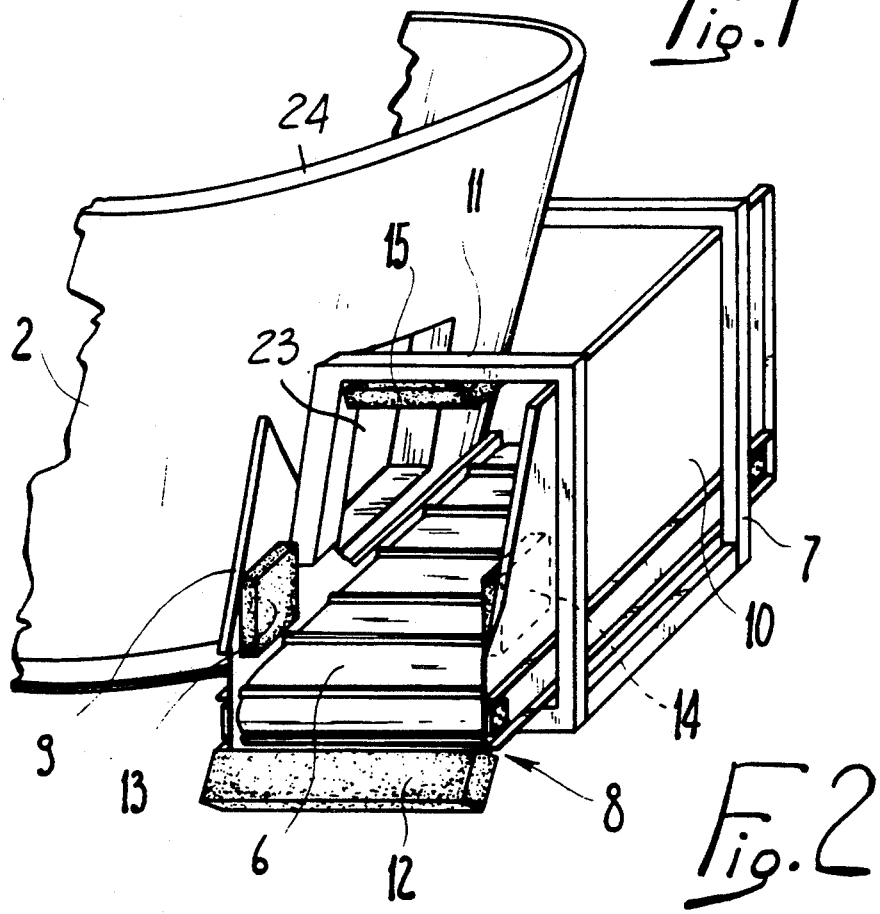
FIG. 2 is an enlarged perspective view of the apparatus according to the invention.

With reference to the above figures, a mixing truck for fibrous products is generally indicated by the reference numeral 1 and is substantially constituted by a container 2, which preferably has an annular wall 24 in the shape of an inverted truncated cone. The container 2 is open upwardly and has a base 25, fixed to a chassis 3 with wheels 4, and to a supporting structure 7 rigidly connected to the chassis 3.

The chassis is advantageously provided with a connector 20 to permit the truck 1 to be towed by a tractor or similar motorized vehicle, and props 21 which can be locked by known per se clamp means 22 in a lowered position (as illustrated in FIG. 1), to support the chassis 7 in a horizontal position when uncoupled from a towing vehicle.

Said container 2 has, inside it, a mixing device expediently constituted by a substantially vertical worm screw or auger.

Known per se drive means (which are thus not illustrated) are provided. Such drive means may comprise e.g., an electric or hydraulic motor, or an internal combustion engine, and suitable kinematic transmission means such as gearwheels, belts etc.. Obviously, clutch and/or gear devices may be provided for controlling the activation and operating conditions of the mixer. Means for connection to an external power source such as a tractor power drive take-off means may also be provided.

An unloading outlet 23 is provided in the wall 24 of the container 2 and a shutter or door 5 is arranged at said opening 23.

The door 5 may be pivotally or slideably connected to the container 1 or to the supporting structure 7, and remote control means may be provided for selectively opening and closing said door for unloading the mixed products onto a conveyor belt 6 rigidly associated with the supporting structure 7 fixed to the chassis 3.

The conveyor belt advantageously has a lower chute 8 transversely delimited by lateral walls 9,10, and upwardly delimited by at least one upper member 11, expediently constituted by a tubular element 11 constituting part of the supporting structure 7.

According to the invention, permanent magnets 12, 13, 14 and 15 are applied in the terminal region of said conveyor belt 6 and are advantageously fixed respectively (as seen in the figures) directly underneath the outlet end of the conveyor belt 6, to lateral walls 9 and 10, and to the upper tubular element 11.

Said permanent magnets attract and retain any pieces of iron, wires or similar ferromagnetic material, which may be contained in the mixed product to be distributed to animal feeding troughs.

The animals are thus protected against problems deriving from the possible ingestion of ferromagnetic material which may be present in the mixed fodder.

The permanent magnets, besides being applied on the described type of conveyor belt, can naturally be applied to conveyor belts with single- or dual-side discharge, or conveniently even to other types of unloading device.

Obviously, the conveyor belt 6 may be provided with independent conveyor-drive means, or transmission means may be provided whereby the conveyor can be powered by the drive/transmission means provided for powering the mixer.

It has thus been observed that the apparatus has achieved the intended aim and objects.

In practice, the materials employed, as well as the dimensions, may be any according to the requirements.

I claim:

1. Apparatus for screening animal fodder products comprising a container having a substantially annular side wall and a base and being mounted on a chassis having wheels, a supporting structure mounted on said chassis adjacent to said container, an opening provided in said annular side wall of said container, a door for selectively closing said opening, and a conveyor belt being supported by said supporting structure and being located beneath said opening, thereby for fodder to flow out of said container through said opening to said conveyor belt, said supporting structure comprising a pair of side walls arranged at the sides of said conveyor belt and extending upwardly therefrom, said supporting structure further comprising at least one upper horizontal member extending above said conveyor belt between said pair of side walls, a lower chute through which the animal fodder products are conveyed by said conveyor belt being defined which is transversely delimited by said pair of side walls and which is upwardly delimited by said conveyor member and which is downwardly delimited by said conveyor belt, said conveyor belt having an outlet end where the animal fodder products depart from said conveyor belt, said apparatus further comprising a plurality of permanent magnets, said plurality of permanent magnets comprising a first permanent magnet fixed to said upper horizontal member and facing downwardly towards said conveyor belt, a second permanent magnet and a third permanent magnet connected each to a respective one of said pair of side walls and both facing inwardly of said lower chute, and a fourth permanent magnet connected to said supporting structure directly below said outlet end of said conveyor belt, thereby to effectively remove and retain any ferromagnetic material inadvertently contained in animal fodder being conveyed through said chute and beyond said outlet end of said conveyor belt.

2. Apparatus according to claim 1, wherein said conveyor belt has a longitudinal extension, and wherein said second and third magnets are arranged between said first magnet and said fourth magnet with respect to said longitudinal extension of said conveyor belt.

* * * * *